United States Patent

[11] 3,595,022

[72] Inventors Reinhart Radebold;
 Hermann Lang, both of Berlin, Germany
[21] Appl. No. 835,279
[22] Filed Apr. 9, 1969
 Division of Ser. No. 717,287, Mar. 29, 1968.
[45] Patented July 27, 1971
[73] Assignee Licentia Patent-Verwaltungs G.m.b.H.
 Frankfurt am Main, Germany
[32] Priority Apr. 1, 1967, July 11, 1967
[33] Germany
[31] L 56 149 and L 56 963

[54] THERMODYNAMIC REACTION DRIVE
 10 Claims, 4 Drawing Figs.
[52] U.S. Cl. .................................... 60/258,
 60/39.46, 60/39.48, 60/259, 60/267, 60/270
[51] Int. Cl. ....................................... F02k 9/02,
 F02k 7/10
[50] Field of Search .......................................... 60/39.48,
 259, 258, 264, 39.46, 257, 267, 270

[56] References Cited
 UNITED STATES PATENTS
| | | | |
|---|---|---|---|
| 2,408,111 | 9/1946 | Truax | 60/39.48 |
| 3,102,388 | 9/1963 | Abild | 60/259 |
| 3,107,485 | 10/1963 | Toulmin | 60/260 |
| 3,116,603 | 1/1964 | Hausmann | 60/224 |
| 3,149,460 | 9/1964 | Rocca | 60/39.46 |
| 3,203,171 | 8/1965 | Burke | 60/211 |
| 3,320,742 | 5/1967 | Truax | 60/39.48 |
| 3,368,354 | 2/1968 | Adelman | 60/39.72 |

FOREIGN PATENTS
| | | | |
|---|---|---|---|
| 276,911 | 8/1930 | Italy | 60/260 |
| 1,004,298 | 11/1951 | France | 60/258 |

Primary Examiner—Douglas Hart
Attorney—Spencer & Kaye

ABSTRACT: A thermodynamic reaction drive or rocket engine which employs liquefiable solid propellant. An alkali metal, which is used as the propellant, is stored in the fuel tank of the rocket engine in the solid state and then, whenever engine operation is desired, liquefied by heating to the necessary temperature. The liquid propellant is fed from the fuel tank through a De Laval nozzle into the mixing or combustion chamber where it is combined with an oxidizer. The propellant, which can be forced through the nozzle primarily by means of its own vapor pressure, is changed over at the nozzle into a two-phase flow. The oxidizer, which is simultaneously introduced into the mixing chamber at a higher pressure than the pressure in the chamber, effects the combustion of the propellant so that the internal energy of the products of combustion may be converted to kinetic energy in an appropriate thrust nozzle.

PATENTED JUL 27 1971 3,595,022

Inventor
Reinhart Radebold
Hermann Lang

By Spencer & Kaye
Attorneys

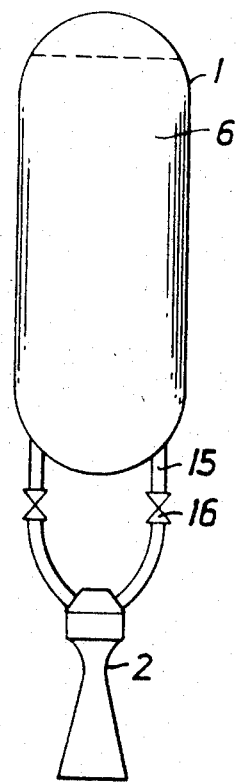
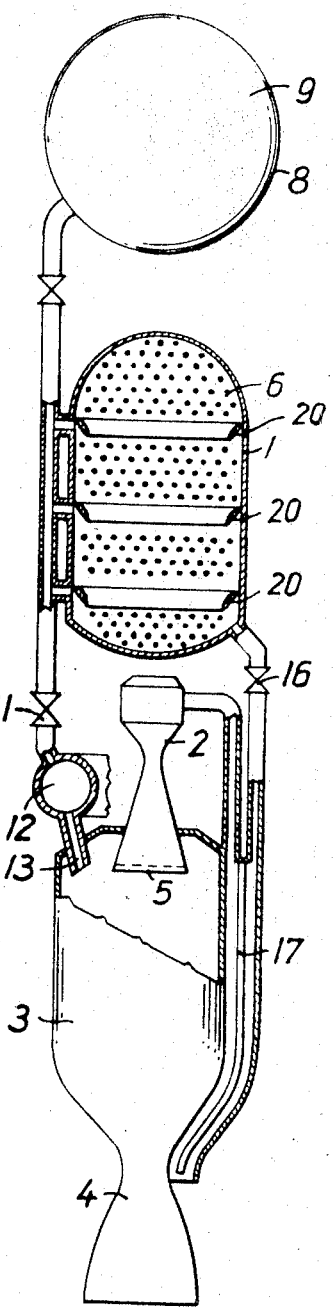

THERMODYNAMIC REACTION DRIVE

CROSS-REFERENCE TO RELATED APPLICATION

This application is a division of our copending application Ser. No. 717,287, filed March 29th 1968, entitled THERMODYNAMIC REACTION DRIVE.

BACKGROUND OF THE INVENTION

The present invention relates to a thermodynamic reaction drive or rocket engine.

The rocket engines known in the art, which are used, for example, in spacecraft, operate with either solid or liquid propellants. Solid propellants have the disadvantage that, once the rocket engine is ignited, its thrust can not be controlled and must continue until all of the propellant has been oxidized. A rocket engine utilizing liquid propellant can, in fact, be controlled by apportioning, e.g., by means of pumps, the amount of propellant which is permitted to react. The utilization of liquid propellant such as liquid hydrogen and oxygen, however, requires that certain safety measures be taken to avoid explosions. A further disadvantage of the liquid propellant rocket engine is that, when installed in a spacecraft, it requires an extensive ground installation and, because the liquid propellant can not continuously be maintained in the engine's fuel tanks, it requires an elaborate starting procedure.

It is also known in the art to employ as a propellant a mixture of a metal powder and a liquid reaction partner. To guarantee a homogeneous mix this propellant mixture is embedded in a gel which is normally solid but which becomes fluid or forms an emulsion when it is pumped to be injected into the combustion chamber. However, even this type of rocket engine requires considerable technical effort in its design and construction.

SUMMARY OF THE INVENTION

An object of the present invention, therefore, is to provide a thermodynamic reaction drive, or, in particular, a rocket engine for spacecraft, which does not admit of the disadvantages described above and which may be realized by apparatus which is relatively easy to construct.

This, as well as other objects which will become apparent in the discussion that follows, is achieved, according to the present invention, by employing an alkali metal as the propellant. This propellant is stored in the rocket engine fuel tank in the solid state and then, when engine operation is desired, liquefied by heating to the necessary temperature. The liquid propellant is fed from the fuel tank through a De Laval nozzle into the mixing or combustion chamber where it is combined with an oxidizer. The propellant, which can be forced through the nozzle primarily by means of its own vapor pressure, is changed over at the nozzle into a two-phase flow. The oxidizer, which is simultaneously introduced into the mixing chamber at a higher pressure than the pressure in the chamber, effects the combustion of the propellant so that the internal energy of the products of combustion may be converted to kinetic energy in an appropriate thrust nozzle.

BRIEF DESCRIPTION OF THE DRAWINGS

FIG. 3 is a schematic diagram of the propellant injecting portion of rocket engine apparatus according to another preferred embodiment of the present invention.

FIG. 4 is a schematic diagram of rocket engine apparatus according to another preferred embodiment of the present invention.

DESCRIPTION OF THE PREFERRED EMBODIMENT

Figure 1:
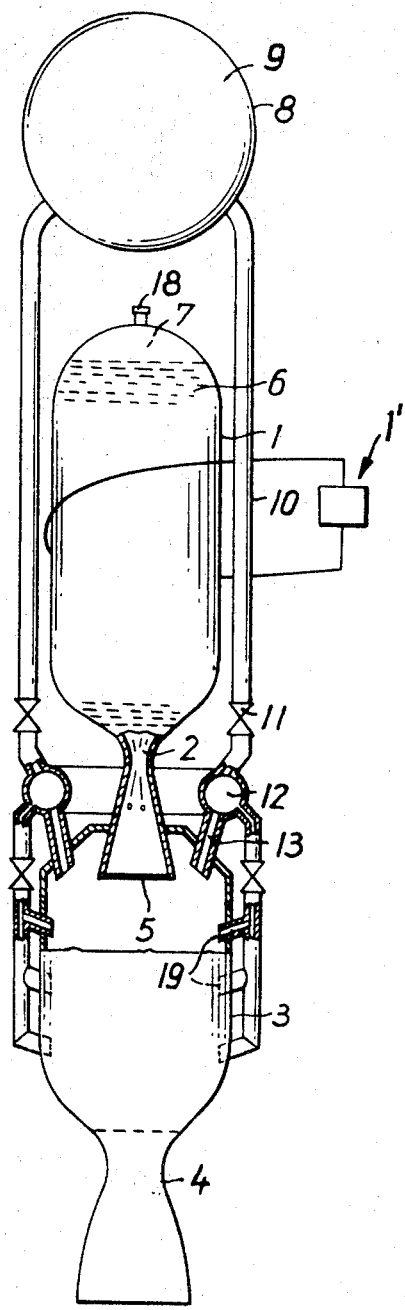
FIG. 1 is a schematic diagram of rocket engine apparatus according to one preferred embodiment of the present invention.

Referring now to the drawings, FIG. 1 illustrates one embodiment of the rocket engine apparatus according to the present invention. The fuel tank 1 in FIG. 1 is connected via a De Laval or converging-diverging nozzle 2 with a mixing or, in this case, combustion chamber 3. The De Laval nozzle projects into the combustion chamber. A thrust nozzle 4, which is likewise constructed as a De Laval nozzle, is attached to combustion chamber 3. The fuel or propellant 6 which may, for example, be potassium, is introduced into the fuel tank in the liquid state and allowed to solidify. The De Laval nozzle 2 is initially closed in the manner known in the art by a diaphragm 5 held in a groove in the nozzle periphery.

If the potassium propellant in the fuel tank is brought to a temperature of about 900° C. by means of heating apparatus 1' it will liquefy and, with the engine apparatus arranged in the vertical position, will form a vapor space 7 at the top of the tank that has a pressure of approximately 20 atmospheres.

The notch in which the diaphragm 5 is mounted is so dimensioned that the diaphragm will automatically blow off at this pressure. The liquid potassium will then enter the mixing chamber in finely distributed droplets. A thermodynamic atomization of the potassium will take place as a result of its own vapor. If it be assumed that the expansion in the De Laval nozzle 2 is adiabatic, it follows that small bubbles of superheated vapor will be produced as a result of the pressure drop, which bubbles will distribute the kinetic energy of the fluid as they expand forming an almost homogeneous two-phase flow. This thermodynamic atomization can thus provide about 20 percent of the total thrust of the rocket engine; that is, sufficient thrust to cause the engine to hover.

The oxidizing agent or oxidizer 9 in the container 8 is led through regulator valves 11, a collecting ring 12 and the injector nozzles 13 into the combustion chamber. The nozzles 13 can be arranged in a ring, for example, in the manner well known in the art. If necessary, the oxidizer may be preheated prior to injection so that its pressure will lie above the ambient pressure in the combustion chamber.

The internal energy of the products of combustion produced by the oxidation will be converted into kinetic energy in the thrust nozzle 4.

A halogen is preferably employed as oxidizing agent in this rocket engine. By using a halogen, fluorine or chlorine, in particular, it is possible to obtain the necessary vapor pressure by preheating, as mentioned above, making it unnecessary to employ injection pumps.

It is possible to use any substance as an oxidizer which will react with the alkali metal used as fuel. Some of the other oxidizers which will spontaneously react with an alkali metal are oxygen, halogens and alcohols.

Figure 2:
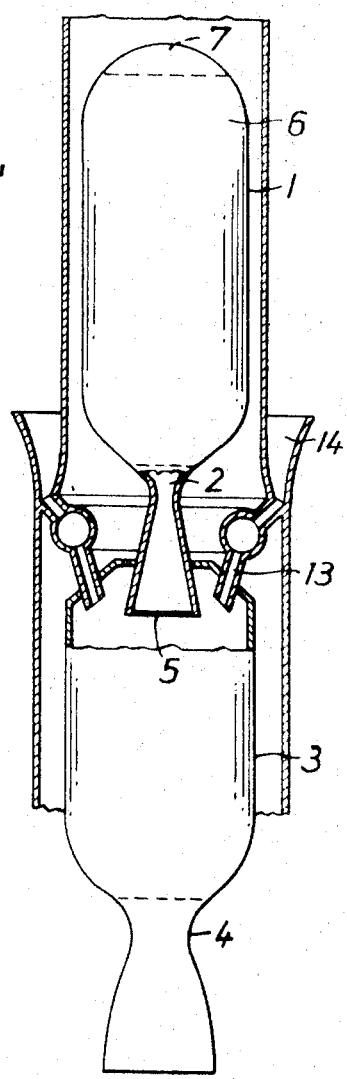
FIG. 2 is a schematic diagram of rocket engine apparatus according to another preferred embodiment of the present invention.

The oxidation of the propellant can also be achieved using environmental oxygen during flights in the region of the earth's atmosphere. The necessary pressure can, in this case, be developed by means of an air-catching diffusor 14 as illustrated in FIG. 2. The starting speed of the rocket engine which is required to render the diffusor operative can be produced, for example, by an initial rocket stage or by some other well-known means for accelerating the apparatus on the ground.

It is possible also to provide the engine shown in FIG. 2 with the additional oxidizing apparatus of the type illustrated in FIG. 1 so that halogen can again be used as the oxidizer outside the atmosphere. The utilization of a diffusor makes it possible to exclude an otherwise necessary quantity of oxidizing agent and thus considerably reduce the takeoff weight of the spacecraft.

The utilization of an alkaline metal as the propellant, according to the present invention, permits the thrust of the rocket engine to be switched off or controlled in an advantageous manner. FIG. 3 illustrates one embodiment of the propellant supply system by which this may be accomplished. In this embodiment the propellant 6 is supplied to the De Laval nozzle 2 from the fuel tank 1 through lines 15 and regulating valves 16. This type of propellant supply system does not reduce the efficiency of the rocket engine. The combustion chamber and the oxidizer supply system have not been included in FIG. 3 in the interest of clarity.

In a further advantageous embodiment of the present invention alkaline metal consists of a homogeneous mixture of two alkali elements, one of which, the principal constituent, has a higher specific heat of reaction and a higher boiling temperature than the other, secondary constituent. The secondary constituent thus effects the thermodynamic atomization of the principal constituent, whereas the heat of reaction of the latter delivers the main thrust of the rocket engine. The temperature of the fuel tank during operation is so chosen, in dependence upon the pressure in the mixing chamber, that the secondary constituent boils when it expands in the De Laval nozzle and causes the principal constituent to atomize.

A mixture of potassium and lithium provides especially good results as a two-constituent propellant. A 10—20 percent share of potassium in the total mixture is sufficient here to uniformly and finally atomize the lithium.

According to a still further embodiment of the present invention the propellant may also be inserted into the mixing chamber with the aid of a separate gas. This measure allows the operating temperature of the propellant to be reduced. If the gas, which, for example, may be argon, is employed at a pressure of about 20 atmospheres the normally necessary propellant's temperature of 900° C. may be reduced to approximately 600° C. This gas may be introduced into the fuel tank 1 through an inlet 18 at the top of the tank, as shown in FIG. 1, after the propellant has been liquefied.

It is possible to increase the thrust of the rocket engine if the expansion in the thrust nozzle is made essentially isothermal. This can be achieved by providing a number of oxidizer inlet openings 19 along the longitudinal surface of the combustion chamber so that the combustion process is continued up to the exit opening of the thrust nozzle, as shown in FIG. 1.

The heat generated by the rays of the sun on a launching pad may, for example, be sufficient to liquefy the propellant. In regions where a sufficient amount of solar energy is not normally available it is possible, according to another embodiment of the present invention, to introduce a halogen oxidizer into the solid propellant to liquefy it and raise it to a higher temperature. It is also practical, in addition, to lead the liquefied propellant through a heat exchanger formed by the external surface of the combustion chamber to further increase its temperature before it enters the De Laval nozzle.

A rocket engine constructed according to this embodiment is schematically illustrated in FIG. 4.

Assuming that the propellant 6 is present in the fuel tank 1 in the liquid state, this propellant can pass through the valve 16 into a heat exchanger 17 which consists of an external wall, a guide plate, and the external surface of the combustion chamber 3. When the propellant emerges from the heat exchanger it has attained the temperature of 800 to 1000° C., which is necessary for the operation of the engine.

To bring the rocket engine into the state of operational readiness the initially solid propellant 6 is liquefied by a halogen which serves as an oxidizer. The propellant may be heated in this way, for example, to a mean temperature of about 200 to 300° C. The halogen may, for example, be introduced through the holes in the fuel tank and in the solid alkali metal.

In the embodiment shown in FIG. 4 the internal wall of the fuel tank is provided with distributing rings 20. If the propellant be introduced into the fuel tank in the liquid state through an opening, not shown, at the lower end of the tank, an overpressure formed by the rings will create cavities inside these rings in the region of the tank wall. Closable side openings in the container wall next to these cavities permit the introduction of the halogen, preferably fluorine, when the engine is to be brought into operational readiness. The resultant liberated heat of oxidation liquifies the propellant and brings it up to a mean temperature. It is advantageous if the same halogen which is used to liquefy the propellant be also used for the reaction in the combustion chamber.

The embodiment illustrated in FIG. 4 and described above is additionally advantageous in that it permits a considerable reduction in the thickness of the wall of the fuel tank and therefore in the weight of the rocket engine. This embodiment simultaneously affords an advantageous cooling of the mixing chamber.

It will be understood that the above description of the present invention is susceptible to various modifications, changes, and adaptations, and the same are intended to be comprehended within the meaning and range of equivalents of the appended claims.

We claim:

1. Reaction drive apparatus comprising, in combination:
    a. a fuel tank:
    b. a mass of alkali metal propellant contained in said tank;
    c. a mixing chamber;
    d. first De Laval nozzle means connected to said fuel tank for discharging fuel into said mixing chamber;
    e. heating means for heating said propellant in said tank to a temperature sufficient for causing said propellant to be discharged through said nozzle in a two-phase liquid gas flow; and
    f. means for injecting an oxidizer for said propellant into said mixing chamber.

2. The apparatus defined in claim 1, wherein said mixing chamber is a combustion chamber.

3. The apparatus defined in claim 2, further comprising second De Laval nozzle means connected to said combustion chamber for discharging products of combustion from said combustion chamber.

4. The apparatus defined in claim 3, wherein said first De Laval nozzle means is arranged to discharge fuel in the same direction as said second De Laval nozzle means discharges products of combustion.

5. The apparatus defined in claim 1, further comprising control valve means arranged between said fuel tank and said first De Laval nozzle means for regulating the amount of fuel passing from said fuel tank to said first De Laval nozzle means.

6 The apparatus defined in claim 1, wherein said means for injecting an oxidizer into said mixing chamber includes diffusor means for catching atmospheric air and injection said air into said mixing chamber.

7. The apparatus defined in claim 3, wherein said means for injecting an oxidizer into said mixing chamber includes injection nozzle means arranged to inject oxidizer at least in the region where said second De Laval nozzle is connected to said mixing chamber.

8. The apparatus defined in claim 7, wherein said injection nozzle means is arranged to inject oxidizer along the entire length of said mixing chamber.

9. The apparatus defined in claim 2, further comprising heat exchanger means connected to said fuel tank, said first De Laval nozzle and to said combustion chamber for preheating said fuel after it leaves said fuel tank and prior to its discharge through said first De Laval nozzle, said heat exchanger using heat generated in said combustion chamber.

10. An arrangement as defined in claim 1, wherein said propellant is normally present in its solid state.